E. MOREWOOD.
APPARATUS FOR COATING METAL-PLATES.
No. 171,684. Patented Jan. 4, 1876.
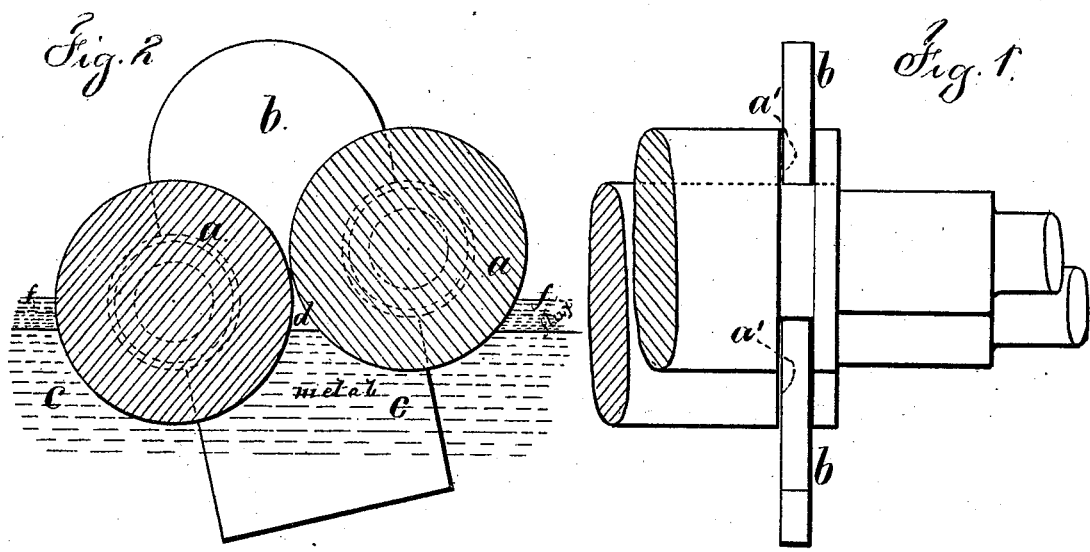
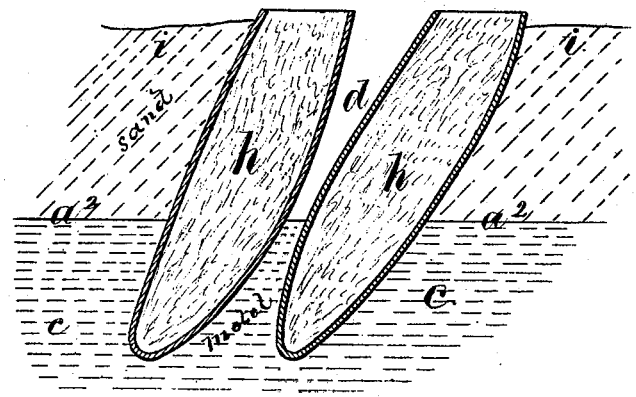
Witnesses
Chas. H. Smyth
Harold Serrell
Inventor
Edmund Morewood
per Lemuel W. Serrell
Atty.

UNITED STATES PATENT OFFICE.

EDMUND MOREWOOD, OF LLANELLY, GREAT BRITAIN.

IMPROVEMENT IN APPARATUS FOR COATING METAL PLATES.

Specification forming part of Letters Patent No. 171,684, dated January 4, 1876; application filed December 6, 1875.

CASE E.

*To all whom it may concern:*

Be it known that I, EDMUND MOREWOOD, of Llanelly, in the county of Carmarthen, Great Britain, formerly of Rock Cottage, Briton Ferry, Glamorganshire, have invented certain Improvements in Coating Metals, of which the following is a specification:

According to this invention, when coating sheets of iron or other metal with tin or terne metal, or other readily-fusible metal, I remove the sheets from a bath of the coating metal through a pair of rollers placed in contact with the molten coating metal, but with their nip or line of contact above it. On the outer sides of the rollers, and resting on the molten metal, grease or flux is placed, so as to rise, by preference, nearly to the top of the rollers; but the grease or flux is not allowed to pass between the rollers, the rollers themselves stopping it back, and there are suitable partitions at their ends. The grease or flux serves to keep the rollers hot and their surfaces in proper working order, and it prevents the formation of a scum on the surface of the coating metal, which, if allowed to form, would adhere to the rollers and spoil the plates passed between them. Little or no grease or flux is allowed to pass between the rollers, so that the plates rise up between them in passing out of the molten coating metal in a finished state, and they do not require to be rubbed with bran, as they do when they are raised out of grease, as is the usual practice. In this way a saving both of grease and of bran, and also in labor, is effected.

In carrying out this part of my invention I prefer to arrange the apparatus in the manner illustrated by the annexed drawing.

Figure 1 is an elevation of the end of the pair of rollers, and Fig. 2 is a cross-section of the same; they are of wrought-iron, tinned or coated with the metal of the bath in which they work, and they are mounted in bearings with springs, and are driven at a convenient speed for withdrawing the plates, all which is well understood.

The melted metal in the bath should be about three-quarters of an inch beneath the nip of the rollers; but when the rollers are under six and a half inches I find one-half inch a good working depth. Near their ends the rollers *a a* have deep grooves *a'* turned in them, and in these grooves the iron partition *b* is loosely supported. The grease or flux on the outer side of the rollers may be three-quarters of an inch in depth. The partition *b*, if not perfectly grease or flux tight when commencing to work, soon becomes so by the thickening of the thick flux around the edges. The rollers equalize, reduce, or finish the coating on the sheets, and assist them in making their exit from the coating metal. The grease or other flux on the exterior side of the rollers *a a* enables me to keep the surface of such rollers clean, hot, and in suitable order for their work. By this means I am able to cause the plate or sheet to rise up from between them coated, but practically free from grease or flux, while such rollers, in revolving, are constantly presenting their surfaces to be washed, cleaned, and warmed by the grease or flux on their exterior side, and are kept in a fitter state to finish, reduce, and improve the coating of the sheets passing up between them than heretofore.

I find it well to make the rollers hollow, and the interior may be filled with sand, or other material which is a slow conductor of heat, as such rollers, after standing, and when they are again started, more quickly get into a proper working state. Partitions *b*, as aforesaid, may also be applied to other withdrawing rollers than those here shown, and enable me to keep the flux at the back of the rollers at a so much higher level than that of the coating metal between the rollers as to keep their surface coating in good order.

For the purpose of making the partition-joints sufficiently tight I use a thick flux, viz: When coating with tin, I consider tallow or palm-oil, with ten to fifteen per cent. of rosin, to be the best flux on the exterior side of the rollers for the purpose of keeping them clean, warm, and in good order, as described. The grease acts most efficiently when it has been in use for some time.

When coating with terne metal, I use clean and fresh rosin by itself, for keeping the rollers in good working order.

In coating with zinc, I use around the rollers what is called old or spent sal-ammoniac flux from the entrance side of the bath, mixed with about twenty-five per cent., by weight, of fresh sal-ammoniac, or such quantity as is required to make the old flux sufficiently fluid for good working. Sometimes, in place of withdrawing the plates from the molten coating metal through rollers, I do so between two guards, by preference made of iron, and placed as closely together as is consistent with the free passage of the plates between them. At the back of the guards the surface of the metal is covered with sand, which is banked, and thus keeps the guards heated. Sometimes I make the guards hollow, and fill them with sand, the more effectually to retain the heat.

In this way I am able to remove the plates from the molten coating metal in a finished state, using little or no grease or flux, so that the plates require no subsequent rubbing.

The guards so narrow the surface of the coating metal exposed at the point of exit that the amount of scum forming upon it is inappreciable, and they also confine the heat in the plate as it rises out of the molten metal, so as to cause the excess of coating metal to draw off from it.

In carrying out this part of my invention, I prefer to use the apparatus shown at Fig. 3. $a^2 a^2$ is the surface-line of the melted metal in the bath. $h\ h$ are two sheet-iron guards or vessels, filled with sand or other slow conductor of heat. These vessels dip down into the metal for some inches, and they stand above the surface of the metal to a height of several inches, as far as is consistent with the convenient manipulation of the plates.

The faces of the vessels $h$, which are opposed to each other, are convex, and the distance between them is least at or about the surface of the melted metal, where it is about three-quarters of an inch. This arrangement is specially applicable for the purpose of reducing or equalizing the coating metal on sheets which are afterward to receive a further coating of melted metal, the object being to cause the plate to pass through a chamber or channel of hot air as it emerges from the coating metal.

In order economically to lessen the radiation of the heat of these guards I place sand, or some material which is a slow conductor of heat, on the exterior side of them, as shown at $i\ i$, and thus I am enabled to bring out the plates at such a temperature that the coating metal runs down from the plate more freely, and is reduced to a greater extent than it would be if such plates, in making their exit from the melted metal, were brought immediately into the unconfined air of the workshop.

When coating with more than one bath of melted coating metal, and when the first bath contains metal of a different kind or a different alloy or mixture of metals from the after-bath, it is important to bring out only so much coating on the surface of the plate to the after-bath as will not materially add to or alter the character of the metal, or alloy, or mixture of metals in the after or finishing bath.

This would often be the case unless special means, such as I have described, were taken to limit the quantity of coating on the surface before the plate in process of coating is brought to the after or last coating-bath of melted metal.

Thus it is sometimes desirable that the coating metal in the first bath should contain ninety-five per cent. of lead to five per cent. of tin, in order to give a foundation coating almost entirely of lead, and that the plate should be finished through a bath containing a mixture of fifty per cent. of lead and fifty per cent. of tin, so as to give a bright and useful wash over the lead foundation; but unless special means are resorted to, the plate brings such a heavy coating of lead on its surface from the first coating-bath that much lead is left behind by each plate as it passes through the after-bath, and the proportions of the alloy therein of fifty per cent. of tin and fifty per cent. of lead are rapidly changed.

The guards $h\ h$ are immersed, as shown in the drawing, to such a depth in the coating metal that any portion of the inner surfaces, between which the coating sheet makes its exit, and against which it is liable to come in contact, shall be of such temperature that the coating metal is not liable to chill or set upon it.

I also make these guards descend to such a depth in the coating metal that any sand on the surface of the coating metal is prevented from being drawn down or so displaced as to be brought into contact with the plate while in process of coating or of making its exit from the bath of coating metal.

I claim as my invention—

1. The rollers $a\ a$, for withdrawing the sheets of metal from a bath of melted coating metal, said rollers touching the molten coating metal, but having their nip or line of contact above it, in combination with the partitions $b$, as and for the purposes set forth.

2. The hollow metallic guards or vessels $h$, filled with sand or other slow conducting material, and passing down into the melted metal, and having a hot-air chamber between their upper portions, substantially as and for the purposes set forth.

EDMUND MOREWOOD.

Witnesses:
I. BEACON PHILLIPS,
   *Bank, Llanelly.*
B. WILLIAMS,
   *Servant to Mr. B. Jones, Llanelly.*